US008738493B2

(12) United States Patent
Martin et al.

(10) Patent No.: US 8,738,493 B2
(45) Date of Patent: *May 27, 2014

(54) INSTANTANEOUS MERCHANT INFORMATION RETRIEVAL FOR FINANCIAL TRANSACTIONS

(71) Applicant: MasterCard International Incorporated, Purchase, NY (US)

(72) Inventors: Kimberly Ann Martin, Maryville, IL (US); Richard Thomas Flynn, Defiance, MO (US); Gary Randall Horn, O'Fallon, MO (US); David Anthony Fink, Chesterfield, MO (US); Thomas Joseph Sellner, Dardenne Prairie, MO (US)

(73) Assignee: MasterCard International Incorporated, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/908,650

(22) Filed: Jun. 3, 2013

(65) Prior Publication Data

US 2013/0262313 A1    Oct. 3, 2013

Related U.S. Application Data

(63) Continuation of application No. 13/549,237, filed on Jul. 13, 2012, now Pat. No. 8,458,071.

(60) Provisional application No. 61/507,414, filed on Jul. 13, 2011.

(51) Int. Cl.
G06Q 40/00    (2012.01)

(52) U.S. Cl.
USPC .............................................. 705/35; 705/44

(58) Field of Classification Search
USPC ...................................................... 705/35–44
See application file for complete search history.

(56) References Cited

U.S. PATENT DOCUMENTS

| 8,458,071 | B2* | 6/2013 | Martin et al. .................... 705/35 |
| 2003/0101137 | A1 | 5/2003 | Wronski, Jr. |
| 2005/0137917 | A1 | 6/2005 | Agapi et al. |
| 2007/0174208 | A1 | 7/2007 | Black et al. |
| 2008/0040274 | A1* | 2/2008 | Uzo ................................ 705/44 |
| 2008/0167980 | A1 | 7/2008 | Aaron et al. |
| 2009/0171955 | A1 | 7/2009 | Merz et al. |
| 2012/0185315 | A1* | 7/2012 | VonDerheide et al. .... 705/14.23 |

OTHER PUBLICATIONS

International Search Report and Written Opinion issued in PCT/US2012/046772.

* cited by examiner

*Primary Examiner* — Thu Thao Havan
(74) *Attorney, Agent, or Firm* — Hoffmann & Baron, LLP (57) ABSTRACT

A solution to resolve ambiguous merchant data in connection with processing a cashless transaction request in a real-time manner. Provided according to the present disclosure are a system and method including a binary-searchable non-transitory computer-readable medium is configure to store a first set of unambiguous merchant identification data having plural data entries therein, each entry corresponding to a merchant. A binary search of the first set of unambiguous merchant identification data is carried out using search keys based upon the ambiguous merchant identification data to determine whether one or more entries of the first set satisfies at least one of a second set of partial match criteria for comparing the ambiguous merchant identification data with the first set of unambiguous merchant identification data. An entry of the first set of unambiguous merchant identification data is assigned to correspond with the ambiguous merchant identification data where at least a predetermined number of the second set of partial match criteria are met.

22 Claims, 5 Drawing Sheets

INSTANTANEOUS MERCHANT INFORMATION RETRIEVAL FOR FINANCIAL TRANSACTIONS

CROSS-REFERENCE TO RELATED APPLICATIONS

This application claims the priority benefit under 35 U.S.C. §120 as a continuation of U.S. patent application Ser. No. 13/549,237, filed 13 Jul. 2012 having the same title and the same inventive entity as the instant application, which application was granted 4 Jun. 2013 as U.S. Pat. No. 8,458,071, and in turn claims the priority benefit under 35 U.S.C. §119(e) of prior U.S. Provisional Patent Application Ser. No. 61/507,411, filed 13 Jul. 2011.

This application is also related to the U.S. Non-provisional Utility patent application Ser. No. 13/548,983 (Assignee Reference No. P00734-US-UTIL), filed 13 Jul. 2012, entitled MERCHANT DATA CLEANSING IN CLEARING RECORD, now pending, by MAC NAIR, Bruce W., et al., which in turn claims the benefit of prior U.S. Provisional Patent Application Ser. No. 61/507,414, filed 13 Jul. 2011, and also of prior U.S. Provisional Patent Application Ser. No. 61/565,362, filed 30 Nov. 2011, and which is commonly assigned with the instant application.

The complete disclosures of each of these aforementioned applications is hereby incorporated herein by this reference in its entirety for all purposes.

BACKGROUND

1. Field of the Disclosure

The present disclosure relates to electronic transaction processing. More specifically, the present disclosure is directed to method and system for providing instantaneous merchant information retrieval concerning a merchant involved in a cashless transaction near-instantaneously to permit its use during transaction authorization and/or clearing.

2. Brief Discussion of Related Art

The use of payment devices for a broad spectrum of cashless transactions has become ubiquitous in the current economy, accounting for hundreds of billions of dollars in transactions during 2011 alone. The process and parties involved can be visualized for example as presented in FIG. 1, and can be thought of as a cycle, as indicated by arrow 10. A device holder 12 may present a payment device 14 to a merchant 16 as payment for goods and/or services. For simplicity the payment device 14 is depicted as a credit card, although those skilled in the art will appreciate the present disclosure is equally applicable to any cashless payment device, for example and without limitation contactless RFID-enabled devices including smart cards, NFC-enabled smartphones, electronic mobile wallets or the like. The payment device 14 here is emblematic of any transaction device, real or virtual, by which the device holder 12 as payor and/or the source of funds for the payment may be identified.

Figure 1:
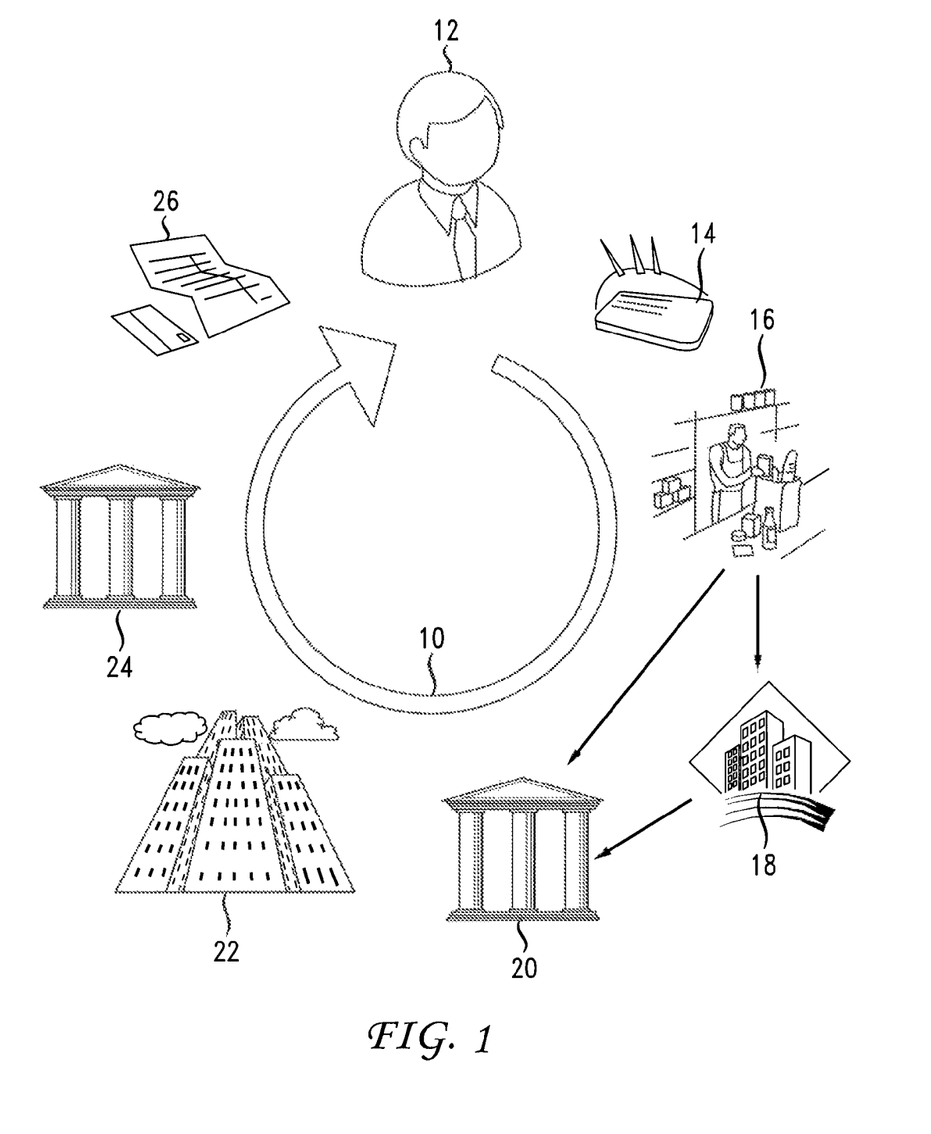
FIG. 1 illustrates a typical cycle for cashless transaction processing.

In cases where the merchant 16 has an established merchant account with an acquiring bank (also called the acquirer) 20, the merchant communicates with the acquirer to secure payment on the transaction. An acquirer 20 is a party or entity, typically a bank, which is authorized by the network operator 22 to acquire network transactions on behalf of customers of the acquirer 20 (e.g., merchant 16). Occasionally, the merchant 16 does not have an established merchant account with an acquirer 20, but may secure payment on a transaction through a third-party payment provider 18. The third party payment provider 18 does have a merchant account with an acquirer 20, and is further authorized by the acquirer 20 and the network operator 22 to acquire payments on network transactions on behalf of sub-merchants. In this way, the merchant 16 can be authorized and able to accept the payment device 14 from a device holder 12, despite not having a merchant account with an acquirer 20.

The acquirer 20 routes the transaction request to the network operator 22. The data included in the transaction request will identify the source of funds for the transaction. With this information, the network operator routes the transaction to the issuer 24. An issuer 24 is a party or entity, typically a bank, which is authorized by the network operator 22 to issue payment cards 14 on behalf of its customers (e.g., device holder 12) for use in transactions to be completed on the network. The issuer 24 also provides the funding of the transaction to the network provider 22 for transactions that it approves in the process described. The issuer 24 may approve or authorize the transaction request based on criteria such as a device holder's credit limit, account balance, or in certain instances more detailed and particularized criteria including transaction amount, merchant classification, etc., which may optionally be determined in advance in consultation with the device holder and/or a party having financial ownership or responsibility for the account(s) funding the payment device 14, if not solely the device holder 12.

The issuer 24 decision to authorize or decline the transaction is routed through the network operator 22 and acquirer 20, ultimately to the merchant 16 at the point of sale. This entire process is typically carried out by electronic communication, and under routine circumstances (i.e., valid device, adequate funds, etc.) can be completed in a matter of seconds. It permits the merchant 16 to engage in transactions with a device holder 12, and the device holder 12 to partake of the benefits of cashless payment, while the merchant 16 can be assured that payment is secured. This is enabled without the need for a preexisting one-to-one relationship between the merchant 16 and every device holder 12 with whom they may engage in a transaction.

The authorization may also be separate in time from the consummation of the transaction. In some cases, an authorization will be taken by a merchant 16, but payment is not made until goods are delivered or the services performed some time later. In any case, on a periodic basis, e.g., daily, the merchant 16 will submit a batch of completed and authorized transactions to the acquirer 20 to receive payment. The acquirer will in turn look to the network operator for payment in a process called "clearing". The clearing records, or list of cleared transactions including data relevant thereto in form and content specified by the network operator 22, is transmitted to the issuer 24.

The issuer 24 may then look to its customer, e.g., device holder 12 or other party having financial ownership or responsibility for the account(s) funding the payment device 14, for payment on approved transactions, for example through an existing line of credit where the payment device 14 is a credit card, or from funds on deposit where the payment device 14 is a debit card. The issuer 24 will prepare a periodic statement 26 listing transactions on the account of a device holder 12, including merchant data as provided by the network operator 22.

One problem that arises is poor quality of the data received from an acquirer 20, particularly where the merchant 16 is separated from the acquirer 20 by a third party payment provider 18. If the network operator 22 could accurately assign the location of the merchant during the authorization processing, that location ID would be available, for example to improve fraud monitoring, or to provide and instant rewards and/or do instant at-the-point-of-sale rebates. That service could be made available to other MasterCard operational entities, perhaps even external customers.

Figure 2:
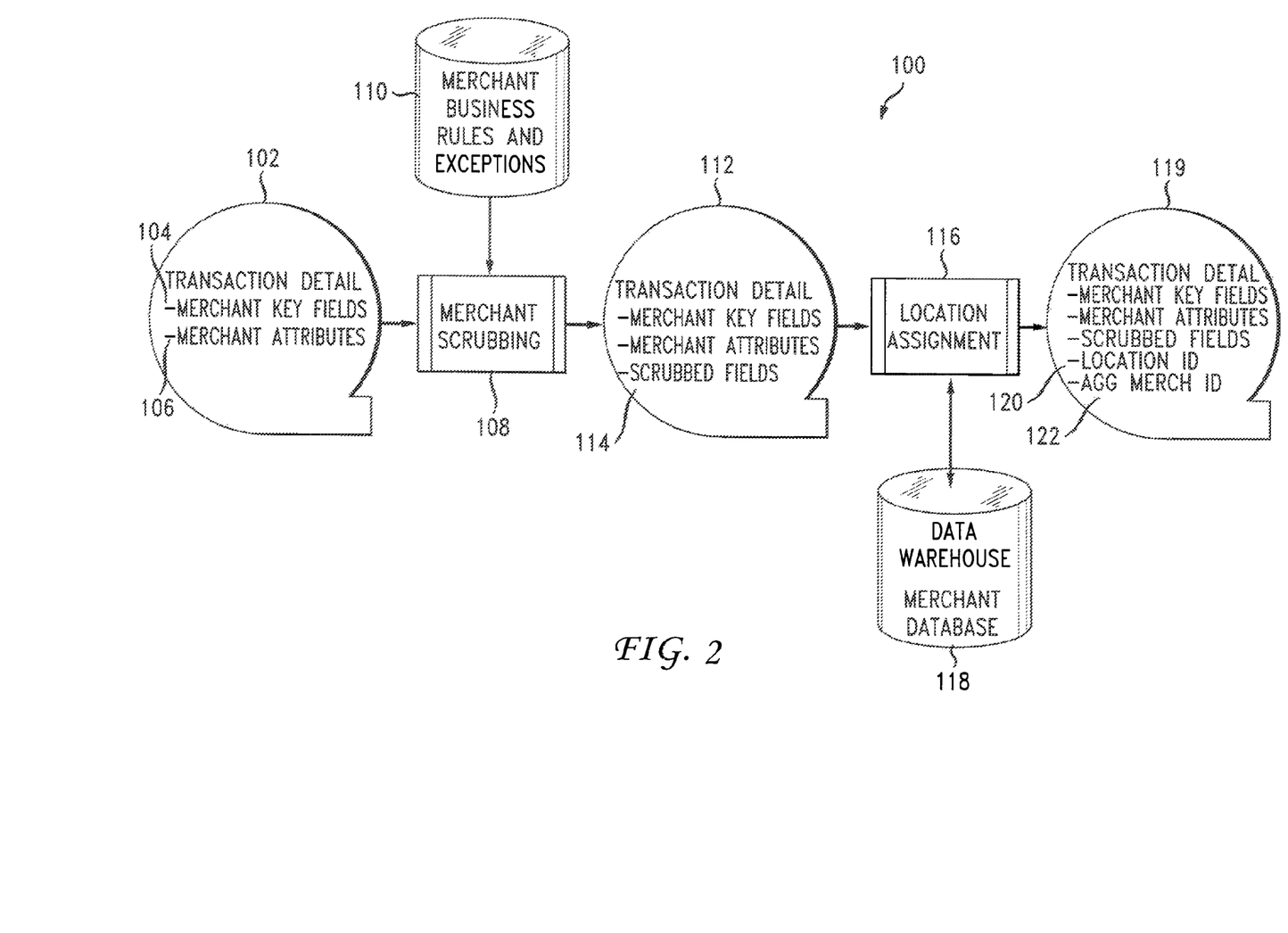
FIG. 2 illustrates a process for merchant location assignment using a conventional SQL database.

FIG. 2 illustrates a process 100 for merchant location assignment using a conventional SQL database. Transaction data 102, including merchant key fields 104 and merchant attributes 106 is received from the acquirer 20. In many cases, the merchant key fields 104 and merchant attributes 106 received from the acquirer 20 is ambiguous to identify the merchant, the transaction location (as compared, for example, to a headquarters of the merchant), or whether the merchant is affiliated with a chain, franchise or the like, where it may be advantageous to consider the merchant as part of a larger aggregate for at least some purposes.

The transaction data 102 is subjected to a merchant scrubbing process 108. The merchant scrubbing process 108 includes the application of a set of scrubbing rules and exceptions 110, for example including address data standardization and/or normalization and the like. The merchant scrubbing process 108 produces scrubbed location data 112. Scrubbed location data 112 includes merchant key fields 104 and merchant attributes 106 received from the acquirer 20 with transaction data 102, as well as the scrubbed fields 114 which are the result of the application of the scrubbing rules and exceptions 110.

A location assignment process 116 queries a relational database 118, alternately referred to as a data warehouse, meaning the specific database 118 or part thereof, or to including the operational characteristics of such data storage. The database 118 stores merchant entries which unambiguously identify characteristics of the merchant (location, affiliation, etc.). The query conventionally involves the use of an SQL database interface or management system, one of which is known by its manufacturer, ORACLE, or an equivalent. The location assignment process 116 may include one or more database queries based upon the scrubbed merchant data fields 114.

Where a suitable match is found in the database 118, the result of the location assignment process 116 would include scrubbed merchant data 119, including the components of the scrubbed location data 112, as well as an assigned merchant location ID 120. Additionally and/or optionally, aggregate merchants, e.g., those belonging to a chain or franchise, would be associated with one another and/or their respective groups as part of the location assignment process 116. Where applicable, the scrubbed merchant data 119 includes an aggregate merchant ID 122. Furthermore, the location scrubbing portion of the merchant data scrubbing process 108 would have used the Oracle only to the extent of logging statistics and rule usage.

The process 100 for merchant location assignment of FIG. 2 and as described above is ordinarily conducted periodically in batches, at least in part because as the database management system is not able to accommodate the throughput requirements to reliably provide a result without delaying the authorization process to an unacceptable degree. Required response times are considered to be at most 100 msec, preferably 50 msec and more preferably 0.5 msec.

A solution to this apparent data deficit problem remains wanting.

SUMMARY

MasterCard International, the assignee of the instant application, in its capacity as network operator 22 in the above-described process has developed a solution to provide cleansed merchant data in a real-time manner. To meet the goal of running within the time frame of an authorization meant that this service was going to have to be support at least 2000 transactions per second. It was initially contemplated that, if all necessary data were to be loaded into RAM, it would be possible to make the processing go fast enough. In this way, the developed process acquired the colloquial name "Merchant in Memory".

Provided according to the present disclosure are a system and method of disambiguating ambiguous merchant identification data received from an acquirer as part of an authorization request for a cashless transaction. A binary-searchable non-transitory computer-readable medium is configure to store a first set of unambiguous merchant identification data having plural data entries therein, each entry corresponding to a merchant. A binary search of the first set of unambiguous merchant identification data is carried out using search keys based upon the ambiguous merchant identification data to determine whether one or more entries of the first set satisfies at least one of a hierarchical second set of partial match criteria for comparing the ambiguous merchant identification data with the first set of unambiguous merchant identification data. An entry of the first set of unambiguous merchant identification data is assigned to correspond with the ambiguous merchant identification data where at least a predetermined number of the second set of partial match criteria are met.

Further embodiments of the present disclosure store in a binary-searchable non-transitory computer-readable medium a third set of aggregate merchant identification data having plural data entries therein, each entry corresponding to an aggregate merchant. A binary search is performed of the third set of aggregate merchant identification data using search keys based upon the ambiguous merchant identification data to determine whether one or more entries of the third set satisfies at least one of a hierarchical fourth set of partial match criteria for comparing the ambiguous merchant identification data with the third set of aggregate merchant identification data. An entry of the third set of aggregate merchant identification data is assigned to correspond with the ambiguous merchant identification data where at least a predetermined number of the fourth set of partial match criteria are met.

The corresponding unambiguous merchant identification data entry may be provided, for example to an acquirer, an issuer, internal fraud monitoring, etc., for furtherance of their activities with respect to the transaction being authorized. In further embodiments of the present disclosure, performing the binary search comprises identifying one or more subsets of entries in the first set of unambiguous merchant identification data which satisfy the partial match criteria in the second set. Moreover, responsive to determining that at least one of the second set of partial match criteria are satisfied, restricting further searching to those partial match criteria of the second set that are above the satisfied criteria in the hierarchy.

The system may be implemented by a computing device, for example and without limitation a computer running Linux operating system, to carry out the steps described.

These and other purposes, goals and advantages of the present disclosure will become apparent from the following detailed description of example embodiments read in connection with the accompanying drawings.

BRIEF DESCRIPTION OF THE DRAWINGS

Some embodiments are illustrated by way of example and not limitation in the figures of the accompanying drawings, in which like reference numerals refer to like structures across the several views, and wherein.

DETAILED DESCRIPTION

In the investigation and development of a number of alternative solutions to the problem described above, it was concluded that even with all the data needed in RAM, the design solution could not support any kind of database management system, and would be limited to a read-only type of solution, consistent with the performance limitations by the operating environment of the authorization process. Any updates to the database would have to be handled elsewhere, for example by forwarding to another service. Considering further these performance requirements of an operating environment such as the authorization process, the process was refined to one which matched transactions to existing locations, so that the network operator 22 could make use of whatever was already known about that merchant location, and in particular identifying an aggregate merchant for all transactions. If transactions could not be matched to existing locations, there was little additional value in creating a new location on the fly, because there would be no additional information about that location. Therefore, the requirements for "Merchant In Memory" functionality were adjusted to reflect these refining assumptions.

Figure 3:
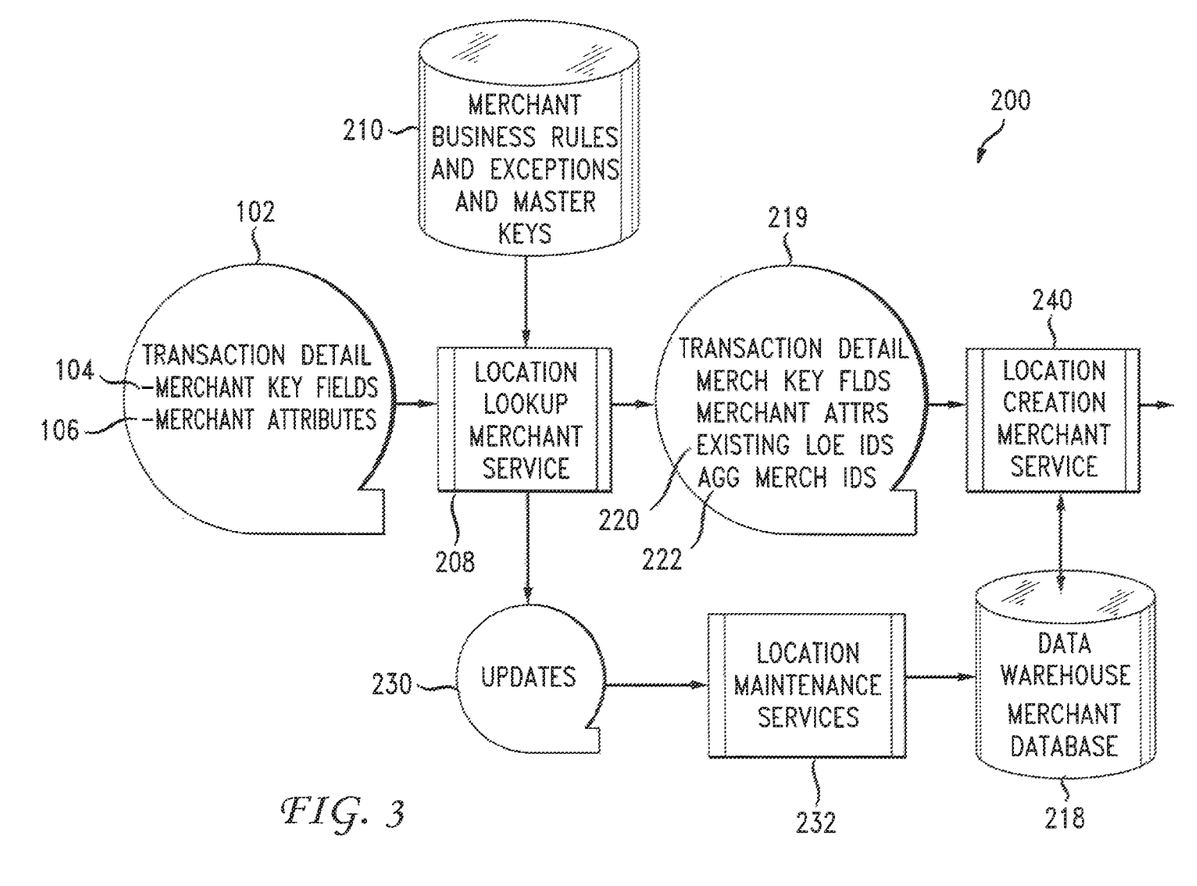
FIG. 3 illustrates a process for the herein-called "Merchant In Memory" association of ambiguous transaction merchant data with any corresponding unambiguous merchant data.

Referring now to FIG. 3, illustrated is a process 200 for the herein-called "Merchant In Memory" association of transaction merchant data with any corresponding merchant data which is known, for example an assigned merchant location ID 220 and optionally aggregate merchant ID 222. A location lookup merchant service 208 applies a stored set 210 of merchant business rules, exceptions, and master keys to facilitate the search process. Under the location lookup merchant service 208, scrubbed fields do not have to be written into the transaction data. Location assignment for existing locations is performed using master keys. In making the assignment of a stored location ID or the like to the corresponding transaction merchant data, the searching which had been performed by Oracle queries with reference to database 118, is accomplished by binary searches of the merchant data stored "flat" in RAM, to be elaborated further hereinafter. An indication of unknown location id is assigned if no match is found. Optionally and additionally, an aggregate merchant is assigned for new locations, pursuant to established aggregation rules.

Further to the limitations discussed above, the location lookup merchant service 208 cannot and will not create new locations, nor update the database 118. Therefore, a subsequent location creation merchant service provides location scrubbing and assignment for new locations. As a result, scrubbed data no longer must be passed via the transaction. The attribute update merchant service 230 provides for updates to the database 118 on behalf of location lookup merchant service 208. Attribute update merchant service 230 and new merchant location creation 240 can be performed batch-wise in an off-line process, as these are not required in the authorization timeframe.

The location lookup merchant service 208 is a 1-step process that includes location scrubbing, location assignment for existing locations, and aggregate merchant assignment for new locations. In the authorization environment, this is all that will be required of the service, since no additional information will be available for new locations. For processes that currently run location assignment in no-update mode so they do not update the merchant database, location lookup merchant service 208 provides all of that functionality in the scrubbing step. With no database access at all, this basically no longer requires any additional system resources.

Figure 4:
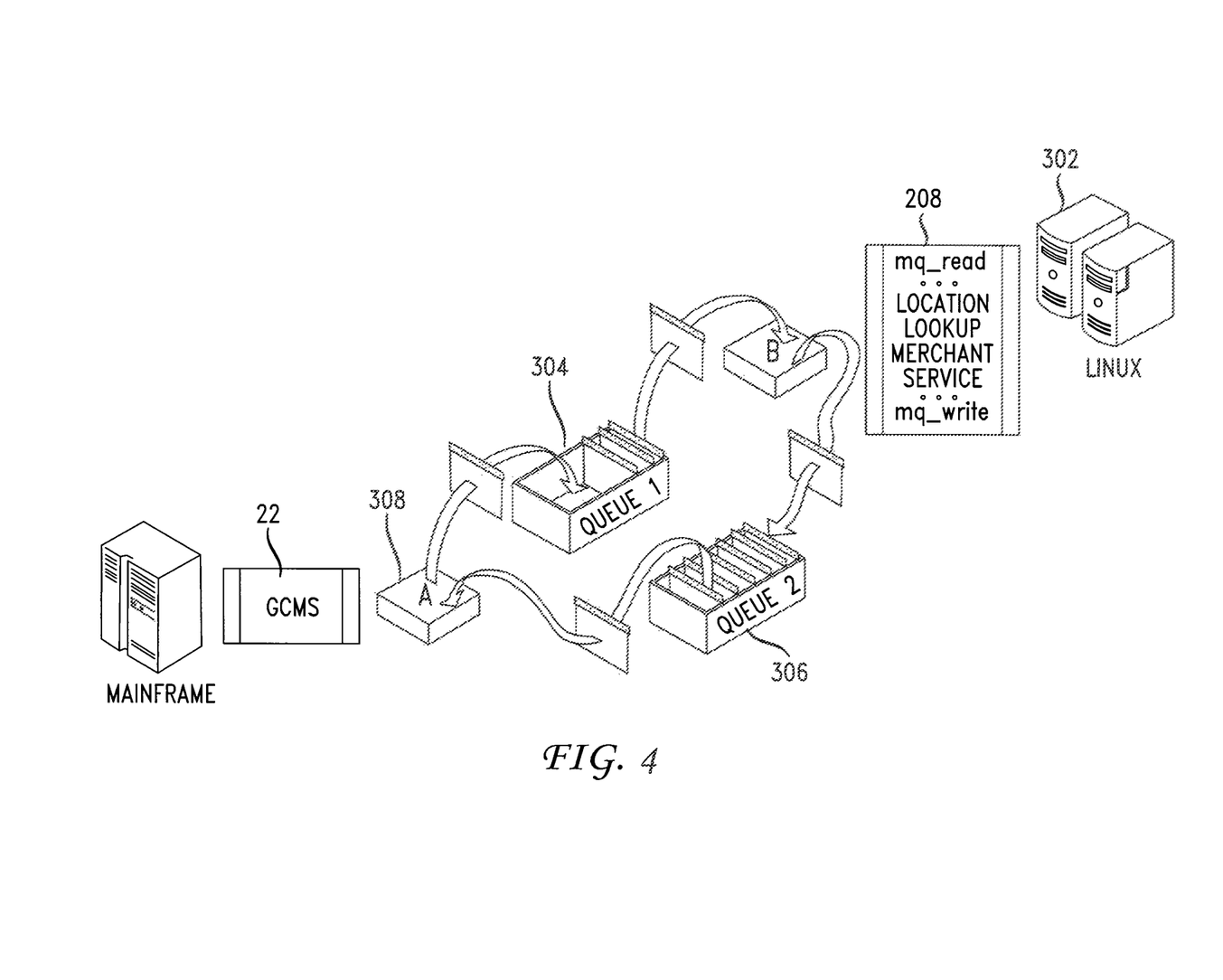
FIG. 4 illustrates schematically message queue passing of merchant location data between the network operator and a location lookup merchant service.

With reference now to FIG. 4, further benefit accrues when the location lookup merchant service 208 is operated on a Linux server 302, where it can be fed transactions coming thru a messaging service from an external application. This, for example, makes the process described herein interoperable with what is described in the co-pending application Ser. No. 13/548,983, incorporated above by reference, as merchant data cleansing in the transaction clearing record. One embodiment of the messaging service is the IBM Message Queue (MQ) product. The network operator 22 may write transactions to MQ 304, which will deliver them to the Linux machine 302 running the location lookup merchant service 208. Therein, a wrapper layer 308 will pass the transaction to location lookup merchant service 208 and then send the results back through the MQ 306 to the network operator 22. A prototype embodiment of the system, operating on a DELL computer running RED HAT Enterprise Linux 5.6, shows more than adequate speed to meet the requirements of the authorization environment. With a single thread, it is possible to achieve over 11K transactions per second (TPS). With four threads, it is possible to achieve over 40K TPS.

Example memory requirements at current levels of operation in the authorization operating environment, etc., are as follows. All the rules required for location scrubbing, i.e., 210, represent approximately 950,000 rules, occupying over 100 MB of RAM. The rules required for aggregation number approximately 55,000 rules, occupying approx. 4 MB of RAM. All the keys used for location assignment total approx. 38,000,000 derived keys and 40,000,000 acquirer keys, which together occupy 10.5 GB of RAM.

The source of the unambiguous merchant identification data is the database 118, and is dumped to "flat" files periodically, e.g., daily. This can also be done with respect to the aggregate merchant data. That example in particular may be done with less frequency, e.g., monthly. The tasks that dump the data to flat files can also push these flat files to a list of servers. These tasks are also responsible for reloading the flat files into shared memory. On the Dell boxes, a daemon program will be running that is triggered upon the arrival of a new set of files and loads those files into shared memory.

In one contemplated embodiment, consider that for example if 20 GB of data is to be loaded into shared memory, there will be 40G of memory allocated. Thus, two sets of ping-pong buffers can load a new set of buffers while the old set continues to be used. In certain limited embodiments (for example merchant name cleansing to overcome DNRs as described in Ser. No. 13/548,983), it will not be necessary to load all of the data 118 to accomplish the required processing.

Figure 5:
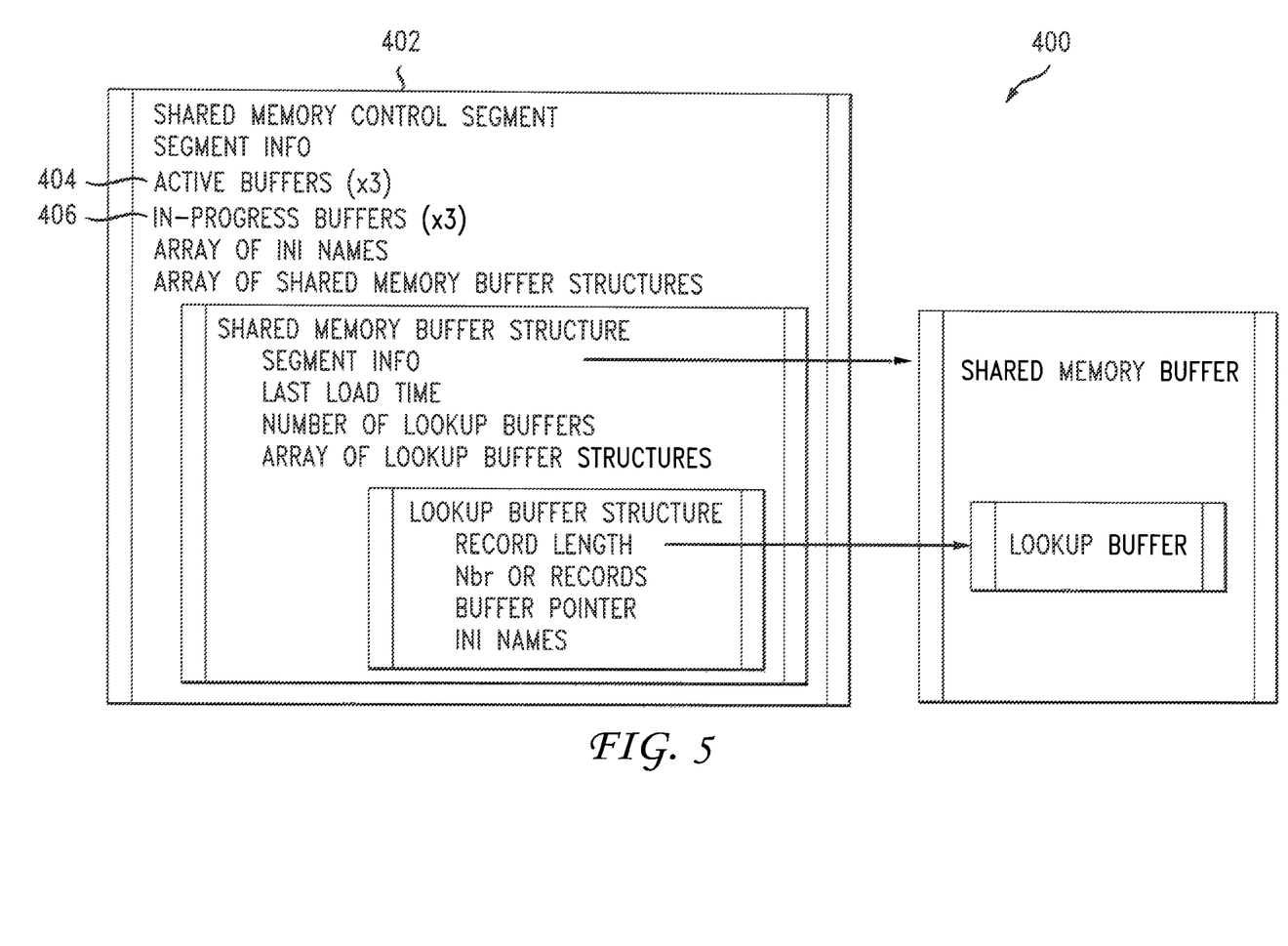
FIG. 5 illustrates one particular layout of shared memory for the Merchant In Memory.

With reference to FIG. 5, illustrated is a more particular layout of shared memory 400, in which there are seven (7) separate shared memory segments. At the top level is a control segment 402 that is the anchor for everything else. There are always three active buffers 404 for Exceptions, Aggregate Merchant Rules, and Masters/Cleansed Data. There will be three in-progress buffers 406 that data can be loaded into. In the top level control segment, the index of the active set and the index of the in-progress set are kept. Once new buffers are loaded, all that is required to switch to the new buffers is update the index of the active buffer set. The array of Shared Memory Buffer Structures is a 2×3 array. The first dimension is for the ping-ponging—typically indexed by the active buffer index. The second dimension indicates the type of the buffer (Exceptions, Aggregate Merchant Rules, or Masters/Cleansed Data). Each of these array elements anchors the actual memory allocation and contains an array of lookup structures that facilitate binary lookups into the data. These structures contain pointers to where their respective data is loaded. The data is accessed by using binary searches, which means that all data in lookup buffers must be ordered properly for their binary searches.

The object of a binary search is to find a particular key value in a large buffer with a minimal number of comparisons and return some information associated with that key—in this example, a location id. According to this technique, the binary search begins in the middle of the buffer, compares the input key to the key in the middle and determines if it is an exact match or if the key we are looking for is above or below the middle. If no match is found, the search is narrowed based on the comparison result to one half of the buffer. A binary search is essentially a recursive algorithm that repeats the comparison on the key in the middle of the rest of the buffer.

Eventually, the binary search either finds a match or runs out of entries to search and returns no match. In C-based programming language, binary searches can be performed fairly easily using the bsearch library function. The bsearch function takes a pointer to a buffer, record length, total number of records, and most significantly, a pointer to a comparison function. The comparison function has to take two parameters, the pointer to the input key and the pointer to the key in the buffer that needs to be compared.

The binary search is driven by the return codes from the comparison function. Those familiar with C might know that most of the C comparison functions have return codes that follow this design. A buffer of null terminated strings can simply use "strcmp" as the comparison function. The buffers used in according to the present disclosure don't have nulls in them. Therefore, "memcmp" is a more useful function, which takes an additional parameter—the length of the comparison. So for each of our binary searches, we have to combine that with a custom comparison function.

Even so, finding exact matches in the buffers is comparatively straightforward. The process becomes considerably more complicated when attempting to use binary searches to do fuzzy matches as a substitute for the fuzzy match performed by the database manager (e.g., ORACLE).

For example, the acquirer keys have a number of fields ordered for binary searches as follows: Merchant Business Region, Merchant Country, Acq Merchant ID, Short Merchant DBA Name, Derived Merchant City, and Derived Merchant Street Address and Merchant State/Province. An exact match is essentially an affirmative memcmp on everything. If an exact match is not found, then part of the fuzzy logic is to search for a Fuzzy match on the Derived Merchant City key field. This requires an exact match on everything except the Derived Merchant City in the search key, but the Derived Merchant City can either be UNKNOWN or a phone number.

A binary search for a subset of fields, in this case those preceding the Derived Merchant City field which does not require an exact match, may match any of a number of buffer entries. It will be necessary to limit the search results to the ones in this set with a fuzzily matching Derived Merchant City, as well as an exact match on Derived Merchant Street Address and Merchant State/Province. However, the records that need to be considered are not ordered in a way that can be binary searched beyond the fields preceding the Derived Merchant City field, so the comparison function cannot tell us which way to go.

Therefore, it is proposed to combine two binary search functions to locate suitable fuzzy matches. The first function finds the first partial match. The way it does this is by adjusting the behavior of the comparison function when it finds a partial match. Rather than returning the match, it continues searching for any preceding partial matches. A second function similarly finds the last partial match. Fuzzy logic searches generally exhibit the basic design of finding a first partial match, a last partial match, then looping through all entries between first and last matches. The loop is exited when a good match is found.

After the location lookup merchant service 208 determines the scrubbed values for fields by application of rules 210, etc., it uses the scrubbed values to generate location keys and lookup the location ID. There are currently two types of location keys: Acquirer Keys, and Derived Keys. These keys are loaded into two separate shared memory buffers, AcqMasters and DerMasters, respectively. The set of fields that are common to both keys are referred to as the base key. The base key consists of Merchant Business Region, Merchant Country, Merchant State/Province, Derived Merchant City, and Derived Merchant Street Address.

Acquirer Keys are built corresponding to the structure of the key data in the AcqMasters buffer. An Acquirer Key consists of a base key plus an Acquirer Merchant ID, and the first three characters of the Short DBA Name (i.e., Short DBA Prefix). Derived Keys are built corresponding to the structure of the key data in the DerMasters buffer. A Derived Key consists of a base key plus a Derived Merchant ID.

Location assignment itself is based on the results of binary searches using the Acquirer Key and Derived Key from the transaction. The first lookup into either set of Keys will be based on exact key matches. If a match is found, no further lookups are required. More preferably, a second exact match will be sought to ensure complete and correct association.

If no exact match Key match is found, subsequent lookups will be attempted with fuzzy matches on one or more of these following fields: Derived Merchant Street Address; State/Province Code; Derived City Name; and Short DBA Prefix (i.e., the first three characters of the Short DBA Name).

Fuzzy match to Derived Merchant Street Address—A null Derived Merchant Street Address (stored as a single hyphen "-") is allowed to match any non-null Derived Merchant Street Address. Similarly, a non-null Derived Merchant Street Address is allowed to match a null Derived Merchant Street Address ("-"). If there is no exact match on derived merchant street address, the subsequent lookups will look for one of these two types of fuzzy matches: 1) Transaction contains derived merchant street address and the matched Key (location) does not. In this case the Location Master and all acquirer keys and derived keys will need to be updated with the derived merchant street address from the transaction. The transaction would be assigned the Unknown Location ID forcing this transaction to be reprocessed by location creation merchant service 240 to properly update the merchant database 118; and 2) Matched Key (location) contains derived merchant street address and transaction does not. In this case the derived merchant street address from the matched Key must be written to the Last Seen Date Maintenance pipe.

State/Province Code—If the Country Code is "USA" or "CAN" or "AUS", an unknown State/Province Code ("XX" for "USA" or "XP" for "CAN" or "UNK" for "AUS") is allowed to match any valid State/Province Code. Similarly, a valid State/Province Code is allowed to match an unknown State/Province Code. If there is no exact match on State/Province Code, the subsequent lookups will look for one of these two types of fuzzy matches: 1) The transaction contains a State/Province Code and the matched Key (location) has an Unknown State/Province Code. In this case for Canada or Australia the Location Master must be updated with the State/Province Code from the transaction. For USA, the Location Master and Keys must be deleted and re-inserted into a different partition with the State/Province Code from the transaction. The transaction is assigned the Unknown Location ID, forcing this transaction to be reprocessed by location creation merchant service 240 to properly update the merchant database 118; and 2) Matched Key (location) contains State/Province Code and transaction does not. In this case the State/Province Code from the matched Key must be written to the Last Seen Date Maintenance pipe.

Fuzzy match to Derived City Name—Several fuzzy matches on the Derrived City Name may be attempted. For specific acquirers known to corrupt the end of the city name, a derived city name is allowed to match a Derived Master with an initial substring of the derived city name if several other specific conditions apply: No exact matches found for the derived city name; Exact match on State/Province Code; Derived Merchant ID is not "UNKNOWN"; and/or Only a single Derived Master match is found. As a result of this non-exact match on the derived city name, blank key fields must be written to the Last Seen Date Maintenance pipe so no new Master Keys will be created.

For certain acquirers know to corrupt both the start and end of city names, a derived city name is allowed to match parts of the derived city name in a Derived Master if several other specific conditions apply: No exact matches found for the derived city name; Exact match on State/Province Code; Derived Merchant ID is not "UNKNOWN"; and/or only a single Derived Master match is found. As a result of this non-exact match on the derived city name, blank key fields must be written to the Last Seen Date Maintenance pipe so no new Master Keys will be created.

If the derived city name has the value "CITYUNKNOWN" or contains numeric digits (other than trailing numeric digits after at least two alpha digits), it is allowed to match any valid derived city name if several other specific conditions apply:

No exact matches found for the derived city name; No match for specific acquirers known to corrupt the start and the end or the start of the city name is found for the derived city name;

Exact match on all other key parts (i.e. derived merchant street address and State/Province Code);

If an Acquirer Master is matched, only a single Acquirer Master match is found. If the location meets all other conditions, no attempt will be made to find a Derived Master match;

If the Derived Merchant ID is "UNKNOWN", no attempt will be made to find a Derived Master match;

If a Derived Master is matched, only a single Derived Master match is found;

Transactions with derived city names that are partially numeric or "CITYUNKNOWN" must match a derived city name that does not start with a digit (and is not "CITYUNKNOWN"); and/or Transactions with derived city names that are not partially numeric or "CITYUNKNOWN" must match a derived city name that starts with a digit or, in the case of matching to an Acquirer Master, is "CITYUNKNOWN" (matches are not allowed to Derived Masters with "CITYUNKNOWN"). As a result of this non-exact match on the derived city name, an EXCEPTION-FLAG will be written to the last seen date named pipe so that no new Master Keys will be created, and an appropriate exception will be generated that can be processed by the excepts process so that either subsequent transactions will be scrubbed so that they match existing Master Keys, or the location will be scrubbed so that subsequent transactions will match the modified keys. The type of exception generated (as specified by EXCEPTION-FLAG) is dependent upon the type of match and the derived city name in the transaction;

If the derived city name in the transaction is numeric (at least the first 7 characters are numeric and the length is at least 10), EXCEPTION-FLAG=CT is used so an appropriate city-scrubbing exception will be generated for the Country Code, State/Province Code and derived city name from the transaction and using the scrubbed city name from the location;

If a derived city name of CITYUNKNOWN is matched to an Acquirer Master, EXCEPTION-FLAG=AT is used so an appropriate exception will be generated for the MCC, ICA, Country Code, State/Province Code and Acquirer Merchant ID from the transaction and using scrubbed city name from the location;

If the match is to a location with a numeric derived city name (at least the first 7 characters are numeric and the length is at least 10), EXCEPTION-FLAG=CL is used so an appropriate city scrubbing exception will be generated for the Country Code, State/Province Code and derived city name from the location and using the scrubbed city name from the transaction; and/or If the match is to an Acquirer Master with a derived city name of CITYUNKNOWN, EXCEPTION-FLAG=AL is used so an appropriate exception will be generated for the MCC, ICA, Country Code, State/Province Code and Acquirer Merchant ID from the location and using the scrubbed city name from the transaction.

Fuzzy match to Short DBA Prefix (the first three characters of the Short DBA Name)—For debit or for acquirers known to put addresses in the merchant dba name field and either there is no derived address or the derived merchant id begins with a digit, or when there is an exact match on the derived merchant street address, the short DBA prefix match can be ignored (an exact match on state and derived city is required). This enables matching of debit transactions without merchant DBA names. As a result, there are two types of matches that can affect subsequent processing: (1) Exact match on derived merchant street address, and (2) Matched Key (location) contains derived merchant street address and transaction does not. In both cases it is assumed that the Derived Merchant ID does not contain a merchant DBA name, so no derived Key will be created. As a result of this non-exact match on the short dba prefix, blank key fields must be written to the Last Seen Date Maintenance pipe so no new Master Keys will be created.

Fuzzy matches to the derived fields described above are established with respect to a hierarchy of partial match criteria. Any one or preferably more partial matches will be considered acceptable to assign the corresponding location ID. One a minimum requisite number of partial matches is found in the hierarchy, the system may continue to search for further matches only to the extent that the further matches are ranked higher than those already found.

For transactions location assignment is based on the results of the prioritized lookups for exact and non-exact matches as follows (Note, references to city and address refer to the derived city name and derived merchant street address):

1. Exact Acquirer Key match on state and address and city and short DBA prefix: a. In this case we will still look for a priority 2 Derived Key match, and if not found, a priority 4 Derived Key match. If found, and the Derived Key location id is different from the Acquirer Key location id, it will be passed to the Last Seen Date Maintenance as the Der-Location-ID for possible transfer to the Acquirer Key location id.

2. Exact Derived Key match on state and address and city.

3. Exact Acquirer Key match on short DBA prefix and city and state, address in transaction match to no address in location: a. This will require a key lookup with address set to '-', and search all matches for an exact state match—i) If a match to unknown state in location is found, save it as a priority 11 match; ii) If a match of unknown state in transaction to any state in location is found, save it as a priority 13 match; b. In this case we will set the location id to unknown and invoke the location creation merchant service 240 process.

4. Exact Derived Key match on city and state, address in transaction match to no address in location. a. This will require a key lookup with address set to '-', and search all matches for an exact state match—i) If a match to unknown state in location is found, save it as a priority 12 match; ii) If a match of unknown state in transaction to any state in location is found, save it as a priority 14 match. b. In this case we will set the location id to unknown and invoke the location creation merchant service 240 process.

5. Exact Acquirer Key match on short DBA prefix and city and state, no address in transaction match to any address in location. a. This will require a key lookup on the partial key up to the address, and search all matches for an exact state match—i) If a match to unknown state in location is found, save it as a priority 15 match; ii) If a match of unknown state in transaction to any state in location is found, save it as a priority 17 match. b. In this case we will not look for a Derived Key match.

6. Exact Derived Key match on city and state, no address in transaction match to any address in location. a. This will require a key lookup on the partial key up to the address, and search all matches for an exact state match—i) If a match to unknown state in location is found, save it as a priority 16 match; ii) If a match of unknown state in transaction to any state in location is found, save it as a priority 18 match.

7. Exact Acquirer Key match on short DBA prefix and city and address, state in transaction, match to unknown state in location. a. This will require a key lookup with state unknown. b. In this case we will set the location id to unknown and invoke the location creation merchant service 240 process.

8. Exact Derived Key match on city and address, state in transaction, match to unknown state in location. a. This will require a key lookup with state unknown. b. In this case we will set the location id to unknown and invoke the location creation merchant service 240 process.

9. Exact Acquirer Key match on short DBA prefix and city and address, state unknown in transaction match to any state in location. a. This will require a key lookup on the partial key up to the state, and take the first match found. b. In this case we will not look for a Derived Key match.

10. Exact Derived Key match on city and address, state unknown in transaction match to any state in location. a. This will require a key lookup on the partial key up to the state, and take the first match found.

11. Exact Acquirer Key match on short DBA prefix and city, address in transaction match to no address in location, match to unknown state in location. a. This match will have been found while looking for a priority 3 match. b. In this case we will set the location id to unknown and invoke the location creation merchant service 240 process.

12. Exact Derived Key match on city, address in transaction match to no address in location, match to unknown state in location. a. This match will have been found while looking for a priority 4 match. b. In this case we will set the location id to unknown and invoke the location creation merchant service 240 process.

13. Exact Acquirer Key match on short DBA prefix and city, address in transaction match to no address in location, state unknown in transaction match to any state in location. a. This match will have been found while looking for a priority 3 match; b. In this case we will set the location id to unknown and invoke the location creation merchant service 240 process.

14. Exact Derived Key match on city, address in transaction match to no address in location, state unknown in transaction match to any state in location. a. This match will have been found while looking for a priority 4 match. b. In this case we will set the location id to unknown and invoke the location creation merchant service 240 process.

15. Exact Acquirer Key match on short DBA prefix and city, no address in transaction match to any address in location, match to unknown state in location. a. This match will have been found while looking for a priority 5 match. b. In this case we will set the location id to unknown and invoke the location creation merchant service 240 process.

16. Exact Derived Key match on city, no address in transaction match to any address in location, match to unknown state in location. a. This match will have been found while looking for a priority 6 match. b. In this case we will set the location id to unknown and invoke the location creation merchant service 240 process.

17. Exact Acquirer Key match on short DBA prefix and city, no address in transaction match to any address in location, state unknown in transaction match to any state in location. a. This match will have been found while looking for a priority 5 match. b. In this case we will not look for a Derived Key match.

18. Exact Derived Key match on city, no address in transaction match to any address in location, state unknown in transaction match to any state in location. a. This match will have been found while looking for a priority 6 match.

19. Exact Acquirer Key match on city and address, exact or fuzzy match on state, ignore short DBA prefix. a. This will require a key lookup on the partial key up to the short dba prefix, and search all matches for an exact city match, exact address match and either exact or fuzzy state match.

20. Exact Derived Key match on state and address and city, derived id fuzzy match. a. This match type will be applicable to Debit transactions only. b. Only if transaction contains no acquirer merchant id, a valid address and derived merchant id is at least length 3. c. This will require a key lookup on the partial key up to the end of the derived merchant id in the transaction, and search all matches for an exact city, address, and state match.

21. Exact Acquirer Key match on short DBA prefix and city and state, fuzzy match on address. a. Only for acquirers known to corrupt the end of the address; b. Only if transaction contains a derived address with alphas; c. This will require a key lookup on the partial key up to the address, and search all matches for a partial address (initial substring or alpha-only) match and an exact state match.

22. Exact Derived Key match on city and state, fuzzy match on address. a. Only for acquirers known to corrupt the end of the address; b. Only if transaction contains a derived address with alphas. c. Only if derived merchant id is not UNKNOWN; d. This will require a key lookup on the partial key up to the address, and search all matches for a partial address (initial substring or alpha-only) match and an exact state match.

23. Exact Derived Key match on state, fuzzy match on city and address. a. Only for acquirers known to corrupt the end of the city name; b. Only if transaction contains a derived city of length at least 5; c. Only if derived merchant id is not UNKNOWN; d. This will require a key lookup on the partial key up to the city, and search all matches for a partial address (exact match or no address in transaction) match and a partial city (initial substring) match.

24. Fuzzy Derived Key match on city and address and state. a. Only for acquirers know to corrupt both the start and end of the city name; b. GCO or Debit or Auth only (excludes certain card types and clearing transactions); c. Only if transaction contains a derived city of length at least 5; d. Only if transaction contains a derived merchant id of length at least 6 (performance limitation); e. Only if derived merchant id is not UNKNOWN; f. Use only first 20 chars of original merchant dba name; g. Get the transaction scrubbed city name with '%' in place of spaces and at the beginning and end and throwing out all numerics; h. This will require a key lookup on the partial key up to the city, and search all matches for a partial address match (exact match or no address in transaction) and a partial city match (to modified scrubbed city or exact match excluding last two characters of the derived city) and a partial state match (exact match or state unknown in transaction).

25. Exact Acquirer Key match on state and address and short DBA prefix, fuzzy match on city. a. This will require a key lookup on the partial key up to the city, and search all matches for an exact address match and exact state match and CITYUNKNOWN or numeric city (first 7 characters are numeric and the length is at least 10 or any numeric digits other than trailing numerics after at least 2 alpha) to a valid city (not CITYUNKNOWN or numeric); b. If more than one matching key is found, ignore the results.

26. Exact Derived Key match on state and address, fuzzy match on city. a. This will require a key lookup on the partial key up to the city, and search all matches for an exact address match and exact state match and CITYUNKNOWN or numeric city (first 7 characters are numeric and the length is at least 10 or any numeric digits other than trailing numerics after at least 2 alpha) to a valid city (not CITYUNKNOWN or numeric); b. If more than one matching key is found, ignore the results.

27. Exact Acquirer Key match on city and state, fuzzy address match (ignore short DBA prefix). a. Only for acquirers know to put addresses in the merchant name field; b. Either no address in transaction or Derived Merchant ID starts with a numeric (assume the Merchant DBA Name contained the Acquirer Merchant ID). c. This will require a key lookup on the partial key up to the short dba prefix, and search all matches for an exact city match, exact address match (or match any address if no address in transaction) and an exact state match. d. If no address in transaction and more than one matching key is found, ignore the results.

It will be understood that the foregoing list of fuzzy match criteria is exemplary, and may be altered, expanded, contracted, etc., all without departing from the scope of Applicant's present disclosure.

With regard to the aggregate merchant location assignment, the process of performing the match shares many common features with the foregoing location ID assignment. Aggregate merchant IDs are assigned to transactions by location lookup merchant service 208 as described above, and by location creation merchant service 240 described hereinafter.

Once the Location ID for a transaction has been determined, the Location ID and the Aggregate Merchant ID from the Location Master are stored in the transaction.

Aggregate Merchants are assigned to each location master in one of three ways.

1. Aggregate Merchant Business Rule Processing

In location creation merchant service 240, transactions that generate new locations during daily processing of clearing, debit, auth and other designated transactions, the Aggregate Merchant ID is determined dynamically by the location creation merchant service 240 executable. This process preferably connects to shared memory buffers to access the most recently loaded exceptions and aggregate merchant rules. In one embodiment, it is a Pro-C executable using a subroutine shared in common with the Aggregate Merchant Assignment Pro-C executable.

Alternately or additionally, location updates are carried out by exception processing. When exceptions are applied to a location ID, for example by a Location Exceptions executable, exception processing causes the short_DBA_name parameter for a location to change, and Aggregate Merchant ID is predetermined dynamically. This process preferably connects to the Shared Memory Buffers to access the most recently loaded exceptions and aggregate merchant rules. In one embodiment, it is a Pro-C executable using a subroutine shared in common with the Aggregate Merchant Assignment Pro-C executable.

Alternately or additionally, an aggregate merchant assignment is carried out periodically, for example near the end of each month. The Aggregate Merchant process is run to add new Aggregate Merchant Rules, Assigned Merchant ID Lookup Rules, category-specific transaction processing rules such as Oil Brand Lookup Rules, Aggregate Merchant Lookup Rules, Acquirer Merchant ID Lookup Rule, Merchant Tax ID Lookup Rules, Merchant Exceptions, Aggregate Merchant SQL Rules and Manual Aggregate Merchant Rules, all for Aggregate Merchant Assignment.

Aggregate Merchant Assignment Processing using the Aggregate Merchant Business Rules may be performed daily in a location master table by the Pro-C executable. This process connects to the Shared Memory Buffers to access the most recently loaded exceptions and aggregate merchant rules. The executable uses a subroutine shared in common with a Location Assignment executable to process each of the locations in the partition, checking each location to see if the Aggregate Merchant ID of the location is correct based upon the location attributes of the location and the current set of Aggregate Merchant Business Rules, and updates the Aggregate Merchant IDs and associated attributes in Location Masters affected by Aggregate Merchant Business Rule changes.

The Aggregate Merchant Assignment executable is also preferably designed to execute against tables other than the location master. The flexibility to handle various tables is built into the parameter file, which defines the table to be used for Aggregate Merchant Assignment and any additional constraints on which locations to process. Locations processed are restricted to where the Aggregate Merchant Assignment Processing will not override assignments based on Aggregate Merchant SQL Rules or Manual Aggregation.

Aggregate Merchant ID Assignment

In a similar manner to location ID assignment described above, Aggregate Merchant Business Rule processing assigns Aggregate Merchant IDs using a hierarchical list of match priorities. The following is one example list of priorities for applying the various Aggregate Merchant Business Rules.

1) If an Assigned Merchant ID is available, search the Assigned Merchant ID Lookup Rules that have a merchant compare name that is a superstring of another Assigned Merchant ID Lookup Rule, looking for a match using the Assigned Merchant ID, MCC and Short DBA Name.

2) If no match and an Assigned Merchant ID is available, search the Assigned Merchant ID Lookup Rules that have a merchant compare name that is not a superstring of another Assigned Merchant ID Lookup Rule, looking for a match using the Assigned Merchant ID, MCC and Short DBA Name.

3) If no match and an Assigned Merchant ID is available, search the Assigned Merchant ID Lookup Rules that have a merchant compare name that is not a superstring of another Assigned Merchant ID Lookup Rule, looking for a match using the Assigned Merchant ID and Short DBA Name (matching any MCC).

4) If no match, search the Aggregate Merchant Lookup Rules with a begin position of 1 that have a merchant compare name that is a superstring of another Aggregate Merchant Lookup Rule, looking for a match using the Country Code (optional), State/Province Code (optional), MCC and Short DBA Name.

5) If no match, search the Aggregate Merchant Lookup Rules with a begin position of 1 that have a merchant compare name that is not a superstring of another Aggregate Merchant Lookup Rule, looking for a match using the Country Code (optional), State/Province Code (optional), MCC and Short DBA Name.

6) If no match, search the Aggregate Merchant Lookup Rules with a begin position of 2 using the Country Code (optional), State/Province Code (optional), MCC and the appropriate substring of the Short DBA Name.

7) If no match, repeat step 6 for begin positions 3 thru 17.

8) If no match and an Acquirer Merchant ID is available, search the Acquirer Merchant ID Lookup Rules, looking for a match using the MCC, ICA and Acquirer Merchant ID.

9) If no match and an Oil Brand Code is available, search the Oil Brand Lookup Rules, looking for a match using the Oil Brand Code, MCC and Short DBA Name.

10) If no match and an Oil Brand Code is available, search the Oil Brand Lookup Rules, looking for a match using the Oil Brand Code and Short DBA Name (matching any MCC).

11) If no match and a Merchant Tax ID is available, search the Merchant Tax ID Lookup Rules, looking for a match using the Country Code, MCC, Merchant Tax ID, and Short DBA Name (optional).

12) If no match, set the Aggregate Merchant ID based on the MCC to 4511 (for MCCs 3000 . . . 3299), 7512 (for MCCs 3300 . . . 3499) or 7011 (for MCCs 3500 . . . 3799) or to the MCC itself for all other MCCs.

Here again, it will be understood that the foregoing list of fuzzy match criteria is exemplary, and may be altered, expanded, contracted, etc., all without departing from the scope of Applicant's present disclosure.

In one particular embodiment of the present disclosure, location creation merchant service 240 for Clearing, Debit, Auth and Visa transactions is performed by a Pro-C executable. The executable reads transactions from standard input, generates scrubbed merchant fields, performs master key lookups to match transactions to locations, performs all database updates for matched locations and new locations, stores the assigned Location ID (and possibly other fields such as the Aggregate Merchant ID) in the transactions, and writes transactions to standard output. All differences in location assignment between the various systems are driven by the parameter file, which defines the input and output layouts for transactions.

The location creation script automatically handles its own restart requirements by determining how much of the output file has been written, removing any partially written records at the end of the file, and picking up where it left off for each file to be processed. To support this, the location assignment executable commits database updates after every transaction requiring database updates before the transaction is written to output. If a deadlock occurs processing the transaction, the transaction is rolled back, the cache is cleared, and the transaction is reprocessed after pausing for 10 seconds.

Variants of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:

1. A method of resolving ambiguous merchant identification data that forms part of a cashless transaction, the method comprising:

storing in a binary-searchable non-transitory computer-readable medium a first set of unambiguous merchant identification data having plural data entries therein, each entry corresponding to a merchant;

performing a binary search of the first set of unambiguous merchant identification data using search keys based upon the ambiguous merchant identification data to determine whether one or more entries of the first set satisfies at least one of a second set of partial match criteria; and assigning an entry of the first set of unambiguous merchant identification data to correspond with the ambiguous merchant identification data where at least a predetermined number of the second set of partial match criteria are met.

2. The method according to claim 1, further comprising:

storing in a binary-searchable non-transitory computer-readable medium a third set of aggregate merchant identification data having plural data entries therein, each entry corresponding to an aggregate merchant;

performing a binary search of the third set of aggregate merchant identification data using search keys based upon the ambiguous merchant identification data to determine whether one or more entries of the third set satisfies at least one of a fourth set of partial match criteria; and assigning an entry of the third set of aggregate merchant identification data to correspond with the ambiguous merchant identification data where at least a predetermined number of the fourth set of partial match criteria are met.

3. The method according to claim 2, wherein the plural data entries of the third set of aggregate merchant identification data are sequentially ordered.

4. The method according to claim 2, wherein the partial match criteria of the fourth set comprise:

a match using and Assigned Merchant ID, Merchant Classification Code (MCC) and Short Doing Business As (DBA) Name by searching Assigned Merchant ID Lookup Rules that have a merchant compare name that is a superstring of another Assigned Merchant ID Lookup Rule;

a match using the Assigned Merchant ID, MCC and Short DBA Name by searching the Assigned Merchant ID Lookup Rules that have a merchant compare name that is not a superstring of another Assigned Merchant ID Lookup Rule;

a match using the Assigned Merchant ID and Short DBA Name matching any MCC searching the Assigned Merchant ID Lookup Rules that have a merchant compare name that is not a superstring of another Assigned Merchant ID Lookup Rule;

a match using one of a Country Code and State or Province Code, MCC and Short DBA Name searching the Aggregate Merchant Lookup Rules with a begin position of 1 that have a merchant compare name that is a superstring of another Aggregate Merchant Lookup Rule;

a match using one of the Country Code and State or Province Code, MCC and Short DBA Name searching the Aggregate Merchant Lookup Rules with a begin position of 1 that have a merchant compare name that is not a superstring of another Aggregate Merchant Lookup Rule;

a match using one of the Country Code and State or Province Code, MCC and Short DBA Name searching the Aggregate Merchant Lookup Rules with a begin position of 2 through 17, sequentially, that have a merchant compare name that is not a superstring of another Aggregate Merchant Lookup Rule;

a match using the MCC, ICA and Acquirer Merchant ID searching the Acquirer Merchant ID Lookup Rules;

a match using an Oil Brand Code, MCC and Short DBA Name;

a match using the Oil Brand Code and Short DBA Name matching any MCC; and a match using the Country Code, MCC, Merchant Tax ID, and Short DBA Name searching the Merchant Tax ID Lookup Rules.

5. The method according to claim 4, wherein the partial match criteria of the fourth set are hierarchically ordered, and recited in descending rank.

6. The method according to claim 1, further comprising providing at least a portion of the corresponding unambiguous merchant identification data entry to at least one of an acquirer providing the ambiguous merchant identification data in the authorization transaction, and an issuer of a transaction device presented in the cashless transaction.

7. The method according to claim 1, wherein performing the binary search comprises identifying one or more subsets of entries in the first set of unambiguous merchant identification data which satisfy the partial match criteria in the second set.

8. The method according to claim 1, wherein the second set of partial match criteria are hierarchically ordered, the method further comprising, responsive to determining that at least one of the second set of partial match criteria are satisfied, restricting further searching to those partial match criteria of the second set that are above the satisfied criteria in the hierarchy.

9. The method according to claim 1, wherein the plural data entries of the first set of unambiguous merchant identification data are sequentially ordered.

10. The method according to claim 1, wherein the partial match criteria of the second set comprise:

an Exact Acquirer Key match on state and address and city and short DBA prefix;

an Exact Derived Key match on state and address and city;

an Exact Acquirer Key match on short DBA prefix and city and state, address in transaction match to no address in location;

an Exact Derived Key match on city and state, address in transaction match to no address in location;

an Exact Acquirer Key match on short DBA prefix and city and state, no address in transaction match to any address in location;

an Exact Derived Key match on city and state, no address in transaction match to any address in location;

an Exact Acquirer Key match on short DBA prefix and city and address, state in transaction, match to unknown state in location;

an Exact Derived Key match on city and address, state in transaction, match to unknown state in location;

an Exact Acquirer Key match on short DBA prefix and city and address, state unknown in transaction match to any state in location;

an Exact Derived Key match on city and address, state unknown in transaction match to any state in location;

an Exact Acquirer Key match on short DBA prefix and city, address in transaction match to no address in location, match to unknown state in location;

an Exact Derived Key match on city, address in transaction match to no address in location, match to unknown state in location;

an Exact Acquirer Key match on short DBA prefix and city, address in transaction match to no address in location, state unknown in transaction match to any state in location;

an Exact Derived Key match on city, address in transaction match to no address in location, state unknown in transaction match to any state in location;

an Exact Acquirer Key match on short DBA prefix and city, no address in transaction match to any address in location, match to unknown state in location;

an Exact Derived Key match on city, no address in transaction match to any address in location, match to unknown state in location;

an Exact Acquirer Key match on short DBA prefix and city, no address in transaction match to any address in location, state unknown in transaction match to any state in location;

an Exact Derived Key match on city, no address in transaction match to any address in location, state unknown in transaction match to any state in location;

an Exact Acquirer Key match on city and address, exact or fuzzy match on state, ignore short DBA prefix;

an Exact Derived Key match on state and address and city, derived id fuzzy match;

an Exact Acquirer Key match on short DBA prefix and city and state, fuzzy match on address;

an Exact Derived Key match on city and state, fuzzy match on address;

an Exact Derived Key match on state, fuzzy match on city and address;

a Fuzzy Derived Key match on city and address and state;

an Exact Acquirer Key match on state and address and short DBA prefix, fuzzy match on city;

an Exact Derived Key match on state and address, fuzzy match on city; and an Exact Acquirer Key match on city and state, fuzzy address match (ignore short DBA prefix).

11. The method according to claim 10, wherein the partial match criteria are hierarchically ordered, and recited in descending rank.

12. A system for resolving ambiguous merchant identification data that forms part of a cashless transaction, the system comprising:
- a first binary-searchable non-transitory computer-readable medium having a first set of unambiguous merchant identification data having plural data entries therein, each entry corresponding to a merchant; and
- a computing device configured and operative to perform a binary search of the first set of unambiguous merchant identification data using search keys based upon the ambiguous merchant identification data to determine whether one or more entries of the first set satisfies at least one of a second set of partial match criteria, the computing device further configured and operative to assign an entry of the first set of unambiguous merchant identification data to correspond with the ambiguous merchant identification data where at least a predetermined number of the second set of partial match criteria are met.

13. The system according to claim 12, further comprising:
- a second binary-searchable non-transitory computer-readable medium storing a third set of aggregate merchant identification data having plural data entries therein, each entry corresponding to an aggregate merchant,
- the computing device further configured to perform a binary search of the third set of aggregate merchant identification data using search keys based upon the ambiguous merchant identification data to determine whether one or more entries of the third set satisfies at least one of a fourth set of partial match criteria, and to assign an entry of the third set of aggregate merchant identification data to correspond with the ambiguous merchant identification data where at least a predetermined number of the fourth set of partial match criteria are met.

14. The system according to claim 13, wherein the plural data entries of the third set of aggregate merchant identification data are sequentially ordered.

15. The system according to claim 12, wherein the partial match criteria of the fourth set comprise:
- a match using and Assigned Merchant ID, Merchant Classification Code (MCC) and Short Doing Business As (DBA) Name by searching Assigned Merchant ID Lookup Rules that have a merchant compare name that is a superstring of another Assigned Merchant ID Lookup Rule;
- a match using the Assigned Merchant ID, MCC and Short DBA Name by searching the Assigned Merchant ID Lookup Rules that have a merchant compare name that is not a superstring of another Assigned Merchant ID Lookup Rule;
- a match using the Assigned Merchant ID and Short DBA Name matching any MCC searching the Assigned Merchant ID Lookup Rules that have a merchant compare name that is not a superstring of another Assigned Merchant ID Lookup Rule;
- a match using one of a Country Code and State or Province Code, MCC and Short DBA Name searching the Aggregate Merchant Lookup Rules with a begin position of 1 that have a merchant compare name that is a superstring of another Aggregate Merchant Lookup Rule;
- a match using one of the Country Code and State or Province Code, MCC and Short DBA Name searching the Aggregate Merchant Lookup Rules with a begin position of 1 that have a merchant compare name that is not a superstring of another Aggregate Merchant Lookup Rule;
- a match using one of the Country Code and State or Province Code, MCC and Short DBA Name searching the Aggregate Merchant Lookup Rules with a begin position of 2 through 17, sequentially, that have a merchant compare name that is not a superstring of another Aggregate Merchant Lookup Rule;
- a match using the MCC, ICA and Acquirer Merchant ID searching the Acquirer Merchant ID Lookup Rules;
- a match using an Oil Brand Code, MCC and Short DBA Name;
- a match using the Oil Brand Code and Short DBA Name matching any MCC; and
- a match using the Country Code, MCC, Merchant Tax ID, and Short DBA Name searching the Merchant Tax ID Lookup Rules.

16. The system according to claim 15, wherein the partial match criteria of the fourth set are hierarchically ordered, and recited in descending rank.

17. The system according to claim 12, the computing device further configured and operative to provide at least a portion of the corresponding unambiguous merchant identification data entry to at least one of an acquirer providing the ambiguous merchant identification data in the authorization transaction, and an issuer of a transaction device presented in the cashless transaction.

18. The system according to claim 12, the computing device being further configured and operative to performing the binary search including identifying one or more subsets of entries in the first set of unambiguous merchant identification data which satisfy the partial match criteria in the second set.

19. The system according to claim 12, wherein the second set of partial match criteria are hierarchically ordered, the computing device being further configured and operative to, responsive to determining that at least one of the second set of partial match criteria are satisfied, restricting further searching to those partial match criteria of the second set that are above the satisfied criteria in the hierarchy.

20. The system according to claim 12, wherein the plural data entries of the first set of unambiguous merchant identification data are sequentially ordered.

21. The system according to claim 12, wherein the partial match criteria of the second set comprise:
- an Exact Acquirer Key match on state and address and city and short DBA prefix;
- an Exact Derived Key match on state and address and city;
- an Exact Acquirer Key match on short DBA prefix and city and state, address in transaction match to no address in location;
- an Exact Derived Key match on city and state, address in transaction match to no address in location;
- an Exact Acquirer Key match on short DBA prefix and city and state, no address in transaction match to any address in location;
- an Exact Derived Key match on city and state, no address in transaction match to any address in location;
- an Exact Acquirer Key match on short DBA prefix and city and address, state in transaction, match to unknown state in location;
- an Exact Derived Key match on city and address, state in transaction, match to unknown state in location;
- an Exact Acquirer Key match on short DBA prefix and city and address, state unknown in transaction match to any state in location;
- an Exact Derived Key match on city and address, state unknown in transaction match to any state in location;

an Exact Acquirer Key match on short DBA prefix and city, address in transaction match to no address in location, match to unknown state in location;

an Exact Derived Key match on city, address in transaction match to no address in location, match to unknown state in location;

an Exact Acquirer Key match on short DBA prefix and city, address in transaction match to no address in location, state unknown in transaction match to any state in location;

an Exact Derived Key match on city, address in transaction match to no address in location, state unknown in transaction match to any state in location;

an Exact Acquirer Key match on short DBA prefix and city, no address in transaction match to any address in location, match to unknown state in location;

an Exact Derived Key match on city, no address in transaction match to any address in location, match to unknown state in location;

an Exact Acquirer Key match on short DBA prefix and city, no address in transaction match to any address in location, state unknown in transaction match to any state in location;

an Exact Derived Key match on city, no address in transaction match to any address in location, state unknown in transaction match to any state in location;

an Exact Acquirer Key match on city and address, exact or fuzzy match on state, ignore short DBA prefix;

an Exact Derived Key match on state and address and city, derived id fuzzy match;

an Exact Acquirer Key match on short DBA prefix and city and state, fuzzy match on address;

an Exact Derived Key match on city and state, fuzzy match on address;

an Exact Derived Key match on state, fuzzy match on city and address;

a Fuzzy Derived Key match on city and address and state;

an Exact Acquirer Key match on state and address and short DBA prefix, fuzzy match on city;

an Exact Derived Key match on state and address, fuzzy match on city; and an Exact Acquirer Key match on city and state, fuzzy address match (ignore short DBA prefix).

22. The system according to claim 21, wherein the partial match criteria are hierarchically ordered, and recited in descending rank.

* * * * *